United States Patent [19]

Tan et al.

[11] Patent Number: 5,521,277
[45] Date of Patent: May 28, 1996

[54] BENZOBISAZOLE COPOLYMERS CONTAINING TRIARYLAMINO MOIETIES

[75] Inventors: Loon-Seng Tan, Centerville; Kasturi R. Srinivasan, Fairborn, both of Ohio

[73] Assignee: The United States of America as represented by the Secretary of the Air Force, Washington, D.C.

[21] Appl. No.: 380,170

[22] Filed: Jan. 26, 1995

[51] Int. Cl.$^6$ .................................................. C08G 75/32
[52] U.S. Cl. ..................... 528/337; 528/176; 528/179; 528/183; 528/342; 528/348
[58] Field of Search ................................. 528/342, 348, 528/183, 179, 176

[56] References Cited

U.S. PATENT DOCUMENTS

| | | | |
|---|---|---|---|
| 4,900,806 | 2/1990 | Arnold et al. | 528/337 |
| 5,128,443 | 7/1992 | Arnold et al. | 528/337 |
| 5,344,896 | 9/1994 | Dang et al. | 528/342 |

OTHER PUBLICATIONS

T. D. Dang, S. J. Bai, D. P. Heberer, F. E. Arnold and R. J. Spry, "Ionic Conductivity of Conjugated Water-Soluble Rigid-Rod Polymers", *Journal of Polymer Science: Part B: Polymer Physics*, vol. 32, 1941–1950 (1993).

Patricia A. DePra, John G. Gaudiello and Tobin J. Marks, "Conductive Polymers Based upon Rigid-Rod Ultrahigh-Modulus Macromolecules. Electrochemical Doping of Poly(p-phenylenebenzobisthiazole-2,6-diyl)(PBT)", *Macromolecules* 1988, 2295–2297.

M. Ishikawa, M. Kawai and Y. Ohsawa, "Synthesis and properties of electrically conducting polytriphenylamines", *Synthetic Metals*, 40 (1991), 231–238.

C. Y–C Lee, J. Swiatkiewicz, P. N. Prasad, R. Mehta and S. J. Bai, "Third order non-linear optical properties of poly-p--phenylene benzobisthiazole and its novel composite with Zytel processed via methane sulfonic acid solution extrusion", *Polymer*, 1991, vol. 32, No. 7, 1195–1199.

Y. Oishi, H. Takado, M. Yoneyama, M–A Kakimoto and Y. Imai, "Preparation and Properties of New Aromatic Polyamides from 4,4'–Diaminotriphenylamine and Aromatic Dicarboxylic Acids", *Journal of Polymer Science: Part A: Polymer Chemistry*, vol. 28, 1763–1769 (1990).

K. R. Srinivasan, L–S Tan, S. J. Bai and R. J. Spry, "Aromatic Benzobisthiazole Polymers and Copolymers Incorporated with Electron–rich Triarylamino Moieties", *Polymer Preprints*, vol. 35(1), 501–502, Feb. 1994.

A. Troup, J. Mort, S. Grammatica and D. J. Sandman, "Direct Observation of Superexchange in a Disordered Molecular Solid", *Solid State Communications*, vol. 33, pp. 91–93 (1980).

C. S. Wang, J. Burkett, C. Y–C Lee and F. E. Arnold, "Structure and Electrical Conductivity of Ion–Implanted Rigid–Rod and Ladder Polymers", *Journal of Polymer Science: Part B: Polymer Physics*, vol. 31, 1799–1807 (1993).

*Primary Examiner*—P. Hampton-Hightower
*Attorney, Agent, or Firm*—Charles E. Bricker; Thomas L. Kundert

[57] ABSTRACT

A copolymer having repeating units of the formula:

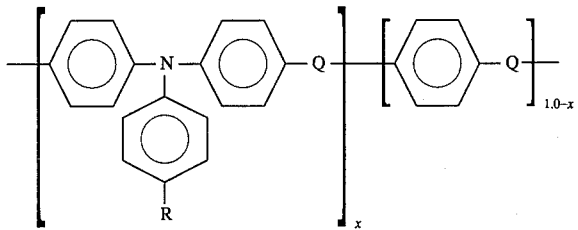

wherein R is selected from the group consisting of —H, —CH$_3$, —N(CH$_3$)$_2$ and —OH, x has a value of 0.01 to 0.99 and Q is

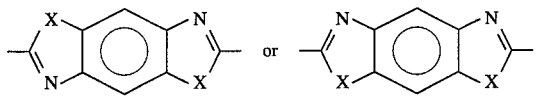

wherein X is —S— or —O—.

11 Claims, No Drawings

BENZOBISAZOLE COPOLYMERS CONTAINING TRIARYLAMINO MOIETIES

RIGHTS OF THE GOVERNMENT

The invention described herein may be manufactured and used by or for the Government of the United States for all governmental purposes without the payment of any royalty.

BACKGROUND OF THE INVENTION

The present invention relates to new benzobisthiazole and benzobisoxazole copolymer compositions containing an electron-rich triarylamine group for multifunctional high performance applications.

Rigid-rod poly(benzobisazole) (PBZ) polymers are well-known for their superior mechanical properties and high-temperature capability which are better than the state-of-the-art Aramids (e.g. Kevlar). The PBZ group includes poly(benzobisoxazole) (PBO), poly(benzobisthiazole) (PBT) and poly(benzobisimidazole) (PBI) polymers. These polymers have been heralded as the next-generation structural materials.

It is known that isotropic and biaxially oriented PBZ films can be rendered electrically conductive via $^{84}Kr^+$-ion implantation. Conductivity as high as 100 S/cm for biaxial oriented film has been achieved. It is also known that a PBZ film can be reduced electrochemically to a conductivity of about 20±10 S/cm. This is in accord with the fact that PBZ is known to be a π-deficient aromatic system as evidenced by both chemical and spectroscopic studies. Certain derivatized PBZ polymers have also exhibited $\chi^{(3)}$ non-linear optical (NLO) properties and ionic conductivity.

It is therefore an object of the present invention to provide novel benzobisazole copolymers containing functional groups for multifunctional high performance applications.

Other objects and advantages of the present invention will be apparent to those skilled in the art.

SUMMARY OF THE INVENTION

In accordance with the present invention there are provided novel benzobisazole copolymers having repeating units of the formula:

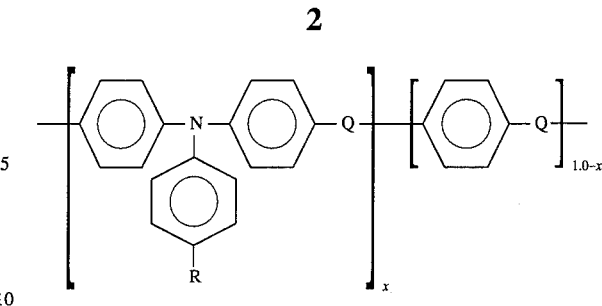

wherein R is selected from the group consisting of —H, —CH$_3$, —N(CH$_3$)$_2$ and —OH, x has a value of 0.01 to 0.99 and Q is

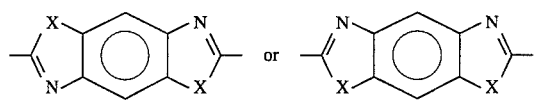

wherein X is —S— or —O—.

The copolymers of this invention are prepared by the polycondensation of a diaminobenzenedithiol or a diaminobenzenediol with a dicyano- or dicarboxylic acid triarylamine, and with terephthalic acid, as shown below. Briefly, the polymerization process comprises the following steps: (i) dehydrochlorination of a diamino-benzenedithiol dihydrochloride or a diamino-benzenediol dihydrochloride in the presence of terephthalic acid and a dinitrile or dicarboxylic acid monomer in 77% polyphosphoric acid (PPA) at 50°–65° C.; (ii) addition of P$_2$O$_5$ to raise the P$_2$O$_5$ content of the medium to 83%; (iii) chain propagation and cyclodehydration; and (iv) precipitation of the polymer into water, followed by washing the polymer with ammonium hydroxide and with hot water and drying the polymer in vacuum at 110° C. The polymerization reaction is, for example:

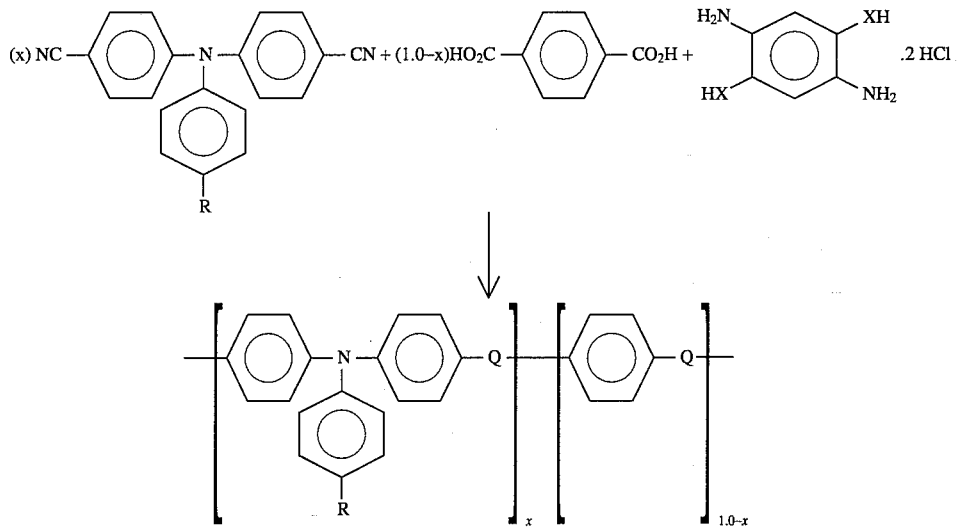

wherein R, X and Q are as defined previously.

The triarylamine monomer can be prepared by the cesium fluoride-promoted, aromatic nucleophilic displacement reaction of 4-fluorobenzonitrile by aniline and certain para-substituted derivatives thereof, in an aprotic polar solvent. The dicyano-triarylamine can be prepared as shown by the following reaction scheme:

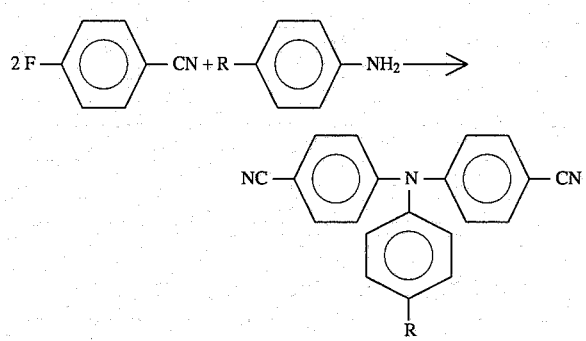

Preparation of the triarylamine monomer is described in our co-pending application Ser. No. 08/380,175, filed of even date herewith.

The dicyano-triarylamine monomers are readily converted to the corresponding dicarboxylic acid monomers under either acidic or basic conditions. Acidic hydrolysis comprises, for example, refluxing the dicyano compound in a mixture of acetic acid and HBr. Basic hydrolysis comprises, for example, refluxing the dicyano compound in a mixture of KOH, ethylene glycol and water, followed by acidic work-up.

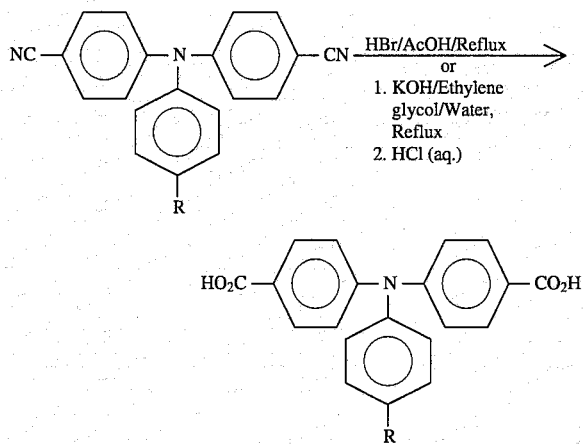

The copolymers of this invention can be cast into film or fiber at the time of precipitation (step iv, above); alternatively, they can be precipitated, washed and dried as discussed previously, then dissolved in a strong acid, such as methanesulfonic acid (MSA), then spin-cast into fibers or cast into film. The copolymers of this invention exhibit increased electrical conductivity, as compared to the poly(p-phenylene benzobisazole) polymers and copolymers. The copolymers of this invention can be treated with iodine to further increase their electrical conductivity.

The following examples illustrate the invention:

EXAMPLE I

Preparation of
Poly[benzo[1,2-d:4,5-d']bisthiazole-2,6-diyl-1,4-phenylene-[[4-(dimethylamino)phenyl]imino]-1,4-phenylene]/[benzo[1,2-d:4,5-d']bisthiazole-2,6-diyl-1,4-phenylene] (10:90 mol %)

Into a four-neck, 150 mL reaction flask were placed 4,4'-dicyano-4"-dimethylamino-triphenylamine (0.4141 g, 1.22 mmol), terephthalic acid (1.8294 g, 11.01 mmol), 2,5-diamino-1,4-benzenedithiol dihydrochloride (DABDT.2 HCl) (3.0000 g, 12.23 mmol) and PPA (77%, 19.55 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. The solution was light green at room temperature and changed to light yellow and then orange on heating at 45° C. for 16 h. The solution was further heated at 60° C. for 3 h and 100° C. for 2 h under vacuum, cooled and $P_2O_5$ (11.21 g) was added. The slightly reddish-orange solution was heated at 120° C. for 6 h, and 140° C. for 16 h. The solution was viscous. On heating at 160° C. for 6 h, the :polymerization solution showed stir-opalescence and was further heated at 180° C. for 4 h. The examination of the final polymer dope under a microscope showed that it was anisotropic (lyotropic) as evidenced by the presence of optical birefringence under cross-polarizing condition. The dark red-yellow solution was precipitated in water, chopped in a blender, neutralized and washed with boiling water for 16 h. The polymer was filtered and dried under vacuum at 110° C. Yield: 3.25 g (92%). [η]=6.86 dL/g. (methanesulfonic acid, 30° C.) Elemental analysis:

|  | C | H | N |
|---|---|---|---|
| Calculated: | 64.37 | 2.60 | 10.72 |
| Found: | 63.00 | 2.62 | 10.43 |

EXAMPLE II

Preparation of
Poly[benzo[1,2-d:4,5-d']bisthiazole-2,6-diyl-1,4-phenylene-[[4-(dimethylamino)phenyl]imino]-1,4-phenylene] /[benzo[1,2-d:4,5-d']bisthiazole-2,6-diyl-1,4-phenylene] (70:30 mol %)

Into a four-neck, 150 mL reaction flask were placed 4,4'-dicarboxy-4"-N,N-dimethylamino-triphenylamine (0.9661 g, 2.8548 mmol), terephthalic acid (0.2032 g, 1.223 mmol), 2,5-diamino-1,4-benzenedithiol dihydrochloride (DABDT.2 HCl) (1.0000 g, 4.078 mmol) and PPA(77%, 22.36 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. The light green solution was stirred at 45° C. for 2 h, at 75° C. for 48 h, to carry out the degassing. The dark red non-homogeneous solution was cooled, and $P_2O_5$ (9.38 g) was added. The reddish-orange solution was heated at 120° C. for 4 h (reddish-black), at 140° C. for 16 h (slightly viscous), at 150° C. for 1 h, at 160° C. for 1 h, at 170° C. for 1 h, at 175° C. for 1 h, and at 185° C. for 2 h. The dark red viscous solution was precipitated in water, chopped in a blender, neutralized and washed with boiling water for 16 h. The red fibrous polymer was filtered and dried under vacuum at 110° C. Yield: 1.53 g (91%). [η]=2.88 dL/g (methanesulfonic acid, 30° C.). Elemental Analysis:

|  | C | H | N |
|---|---|---|---|
| Calculated: | 69.13 | 3.85 | 11.52 |
| Found: | 67.11 | 3.52 | 10.93 |

EXAMPLE III

Preparation of
Poly[benzo[1,2-d:4,5-d']bisthiazole-2,6-diyl-1,4-phenylene- [[4-(dimethylamino)phenyl]imino]-1,4-phenylene]/ [benzo[1,2-d:4,5-d']bisthiazole-2,6-diyl-1,4-phenylene] (50:50 mol %)

Into a four-neck, 150 mL reaction flask were placed 4,4'-dicarbox-4-N,N-dimethylamino-triphenylamine (0.7675 g, 2.039 mmol), terephthalic acid (0.3387 g, 2.039 mmol), 2,5-diamino-1,4-benzenedithiol dihydrochloride (DABDT.2 HCl) (1.0000 g, 4.078 mmol) and PPA(77%, 8.79 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. The light green solution was stirred at room temperature for 0.5 h, at 45° C. for 2 h and at 75° C. for 48 h. At this stage, 8.79 g of 77% PPA was added to the reaction mixture. The dark red non-homogeneous solution was cooled and anhydrous $P_2O_5$ (4.54 g) was added. The solution was heated at 160° C. for 1 h, at 170° C. for 1 h, and at 185° C. for 1 h. The dark red viscous solution was precipitated in water, chopped in a blender, neutralized, and washed with boiling water for 16 h. The red fibrous polymer was filtered and dried under vacuum at 110° C. Yield: 1.38 g (92%). [η]=3.20 dL/g (methanesulfonic acid, 30° C.). Elemental Analysis:

|  | C | H | N |
|---|---|---|---|
| Calculated: | 67.90 | 3.53 | 11.31 |
| Found: | 66.59 | 3.27 | 10.73 |

EXAMPLE VII

Electrical Conductivity

For conductivity measurements, films of poly(p-phenylene benzobisthiazole) and triarylamine-based PBT copolymer were cast from methanesulfonic acid (MSA) solution under reduced pressure at 60° C. To minimize the effect of any residual MSA on the conductivity, all films were thoroughly washed with ammonium hydroxide and distilled water. For the pristine copolymers, the conductivity values ranged from $10^{-10}$ to $10^{-11}$ S/cm, while the film conductivity of poly(p-phenylene benzobisthiazole) was less than $10^{-12}$ S/cm. Thus, the incorporation of triarylamine groups increased the conductivity values by at least 1–2 orders of magnitude.

Cast films of homopolymer poly(benzo(1,2-d:4,5-d')bisthiazole-2,6-diyl-1,4-phenylene-((4 -(dimethylamino)phenyl)imino)-1,4-phenylene), homopolymer poly(p-phenylene benzobisthiazole), and PBT(NMe$_2$)/PBT copolymers 10/90 (Example I) and 70/30 (Example II) were exposed to iodine vapors and were monitored for color changes. The poly(p-phenylene benzobisthiazole) film required several hours to activate the polymer with iodine; in contrast, only 2–3 hours were required to activate the triarylamine-PBT copolymers. On removal of the film from the iodine chamber, the poly(p-phenylene benzobisthiazole) returned to the pristine state in a few hours. The triarylamine-PBT copolymers on the other hand, stayed activated over longer periods (several months). The conductivity values are shown in Table I, below:

TABLE I

| PBT(NMe$_2$)/PBT ratio | Conductivity, S/cm | |
|---|---|---|
|  | Not activated | Iodine activated |
| 100/0[a] | $2 \times 10^{-9}$ | $2.3 \times 10^{-8}$ |
| 70/30 | $<10^{-11}$ | $0.9–1.8 \times 10^{-8}$ |
| 10/90 | $2.7 \times 10^{-10}$ | $5.5 \times 10^{-7c}$ |
| 0/100[b] | $<10^{-12}$ | $<10^{-12}$ |

Note:
[a]Poly(benzo(1,2-d:4,5-d')bisthiazole-2,6-diyl-1,4-phenylene-((4-(dimethylamino)phenyl)imino)-1,4-phenylene) Homopolymer
[b]Poly(p-phenylene benzobisthiazole) Homopolymer
[c]After 3 weeks, the conductivity was $4.5 \times 10^{-9}$ S/cm.

Various modifications may be made in the instant invention without departing from the spirit and scope of the appended claims.

We claim:

1. A copolymer having repeating units of the formula:

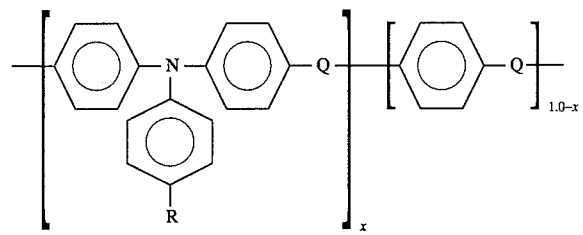

wherein R is selected from the group consisting of —H, —CH$_3$, —N(CH$_3$)$_2$ and —OH, x has a value of 0.01 to 0.99 and Q is

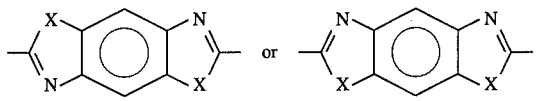

wherein X is —S— or —O—.

2. The copolymer of claim 1 wherein X is —S—.
3. The copolymer of claim 2 wherein R is —N(CH$_3$)$_2$.
4. The copolymer of claim 2 wherein R is —CH$_3$.
5. The copolymer of claim 2 wherein R is —OH.
6. The copolymer of claim 2 wherein R is —H.
7. The copolymer of claim 1 wherein X is —O—.
8. The copolymer of claim 7 wherein R is —N(CH$_3$)$_2$.
9. The copolymer of claim 7 wherein R is —CH$_3$.
10. The copolymer of claim 7 wherein R is —OH.
11. The copolymer of claim 7 wherein R is —H.

* * * * *